United States Patent
Katoh et al.

(10) Patent No.: US 7,440,380 B2
(45) Date of Patent: Oct. 21, 2008

(54) OPTICAL INFORMATION RECORDING MEDIUM AND RECORDING APPARATUS

(75) Inventors: Masaki Katoh, Kanagawa (JP); Yuki Nakamura, Kanagawa (JP); Katsuyuki Yamada, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 719 days.

(21) Appl. No.: 11/105,411

(22) Filed: Apr. 14, 2005

(65) Prior Publication Data

US 2005/0174903 A1   Aug. 11, 2005

Related U.S. Application Data

(63) Continuation of application No. 10/620,692, filed on Jul. 17, 2003, now Pat. No. 6,996,041, which is a continuation of application No. 09/793,131, filed on Feb. 27, 2001, now Pat. No. 7,068,581.

(30) Foreign Application Priority Data

Mar. 3, 2000   (JP)   ............... 2000-058081

(51) Int. Cl.
*G11B 7/007* (2006.01)
(52) U.S. Cl. ............... 369/59.25; 369/275.3
(58) Field of Classification Search .......... None
See application file for complete search history.

(56) References Cited

U.S. PATENT DOCUMENTS

| | | | |
|---|---|---|---|
| 4,360,841 A | 11/1982 | Mita | |
| 5,274,645 A | 12/1993 | Idleman et al. | |
| 5,276,670 A | 1/1994 | Nogami et al. | |
| 5,498,507 A | 3/1996 | Handa et al. | |
| 5,523,140 A | 6/1996 | Tominaga et al. | |
| 5,537,354 A | 7/1996 | Mochizuki et al. | |
| 5,646,924 A | 7/1997 | Nonoyama et al. | |
| 5,661,800 A | 8/1997 | Nakashima et al. | |
| 5,862,112 A | 1/1999 | Nagai et al. | |
| 5,930,209 A | 7/1999 | Spitzenberger et al. | |
| 5,930,825 A | 7/1999 | Nakashima et al. | |

(Continued)

FOREIGN PATENT DOCUMENTS

EP   0 771 000 A2   5/1997

(Continued)

*Primary Examiner*—Joseph Feild
*Assistant Examiner*—Joseph Haley
(74) *Attorney, Agent, or Firm*—Dickstein Shapiro LLP

(57) ABSTRACT

A recordable optical information recording medium having an address t for each sector, comprises: an area A1 starting from an address t1 to which access is made only when a recording apparatus performs recording operation; an area A2 starting from an address t2 to which access is made either when the recording apparatus performs the recording operation or when the recording apparatus performs reproducing operation; and an area A3 starting from an address t3 to which access is made either when either the recording apparatus or a reproducing apparatus performs recording or when either the recording apparatus or the reproducing apparatus performs reproducing. The addresses t are set consecutively with respect to a physical arrangement of the sectors in each of the areas A2 and A3, and the area A1 has at least one inconsecutive part at which the addresses t are not consecutive with respect to the physical arrangement of the sectors.

5 Claims, 4 Drawing Sheets

U.S. PATENT DOCUMENTS

| | | |
|---|---|---|
| 5,982,886 A | 11/1999 | Itami et al. |
| 6,022,605 A | 2/2000 | Kaneko et al. |
| 6,049,505 A | 4/2000 | Fister |
| 6,125,061 A | 9/2000 | Mitani |
| 6,224,959 B1 | 5/2001 | Nagasaka et al. |
| 6,226,255 B1 | 5/2001 | Suzuki et al. |
| 6,269,071 B1 | 7/2001 | Van Den Enden et al. |
| 6,280,810 B1 | 8/2001 | Nakamura et al. |
| 6,310,848 B1 | 10/2001 | Ueki |
| 6,466,535 B2 | 10/2002 | Park |
| 7,038,982 B2 * | 5/2006 | Schreurs et al. .......... 369/47.53 |
| 7,200,083 B2 * | 4/2007 | Chen .................... 369/47.4 |

FOREIGN PATENT DOCUMENTS

| | | |
|---|---|---|
| JP | 01319195 | 12/1989 |
| JP | 5-274819 | 10/1993 |
| JP | 7-266704 | 10/1995 |
| JP | 08-185631 | 7/1996 |
| JP | 08-293151 | 11/1996 |
| JP | 11-086341 | 3/1999 |
| JP | 11-321094 | 11/1999 |
| JP | 2000-052657 | 2/2000 |
| WO | WO 01/27922 A1 | 4/2001 |

* cited by examiner

PRIOR ART

OPTICAL INFORMATION RECORDING MEDIUM AND RECORDING APPARATUS

CROSS REFERENCE TO RELATED APPLICATIONS

The present application is a continuation of U.S. application Ser. No. 10/620,692, filed on Jul. 17, 2003, now U.S. Pat. No. 6,996,041 the disclosure of which is incorporated by reference in its entirety, which in turn is a continuation application of U.S. application Ser. No. 09/793,131 filed on Feb. 27, 2001 (now U.S. Pat. No. 7,068,581, granted Feb. 7, 2006), which claims priority under 35 U.S.C. 119 to the following foreign application: Japanese Application No. 2000-058081, dated Mar. 3, 2000.

BACKGROUND OF THE INVENTION

1. Field of the Invention

The present invention generally relates to an optical information recording medium and a recording apparatus, and, in particular, to an optical information recording medium and a recording apparatus for high-speed recording.

2. Description of the Related Art

Recently, high-speed recording has been rendered for an optical information recording medium such as a write-once compact disk (CD-R), a rewriteable compact disk (CR-RW) or the like, to which a light beam is applied so that a material of a recording layer thereof is changed, and, thereby, information is recorded thereto. Further, there are optical information recording media produced for recording at multiple speeds to which recording can be made at an arbitrary speed, and, for which it has been requested that a quality in recorded signal obtained from being recorded at a high speed is maintained, and, also, it has been requested that a quality in recorded signal obtained from being recorded at a low speed is satisfactory. Especially, according to the Part III of the Orange Book which is a specification of standards for rewriteable compact disks, high-speed recording at a speed four times through ten times, has been being standardized, in contrast to the related art in which recording is made at a speed once through four times. Further, for high-speed recording, it is difficult to apply a constant linear velocity (CLV) form to recording apparatuses in consideration of the apparatus performances. Accordingly, it is necessary to apply a constant angular velocity (CAV) form thereto. In order to apply the CAV recording form, a velocity margin approximately three times is needed for a general optical disk having a diameter of 120 mm.

However, a margin in recording speed has reached a limit for optical information recording media. In particular, for phase-change-type optical information recording media, it has been difficult to widen the margin in recording speed in consideration of property of recording material. Accordingly, optical information recording media which can be used only for high-speed recording result basically. However, actually, when a conventional recording apparatus produced for recording at a low speed is used, and, a recording medium only for high-speed recording is inserted thereto by mistake, a writing process may be forcibly performed on the recording medium after processes such as setting of a recording power through trial writing and so forth. In such a case, due to a difference in material of optical information recording media between conventional ones for low-speed recording and new recent ones for high-speed recording, it is not possible to perform recording through the recording apparatus produced for recording at a low speed, satisfactorily. Accordingly, original data may be erroneously erased, or nonsense writing may be made.

Accordingly, it is necessary that, even from such an optical information recording medium only for high-speed recording, reproducing of recorded data can be performed through a conventional recording apparatus or reproducing apparatus produced for recording/reproducing at a low speed in order that such a recording medium can be used generally and has a compatibility, but, to such a recording medium, recording cannot be performed through such a recording apparatus produced for recording at a low speed.

SUMMARY OF THE INVENTION

An object of the present invention is to provide an optical information recording medium produced for high-speed recording, from which reproducing recorded data can be performed through a conventional recording apparatus or reproducing apparatus produced for recording/reproducing at a low speed, but, to which recording cannot be performed by such a recording apparatus produced for recording at a low speed.

An recordable optical information recording medium, according to the present invention, having addresses t for respective sectors, comprises:

an area A1 starting from an address t1 to which access is made by a recording apparatus only at a time of recording operation;

an area A2 starting from an address t2 to which access is made by the recording apparatus either at a time of recording operation or at a time of reproducing operation; and an area A3 starting from an address t3 to which access is made either by the recording apparatus or a reproducing apparatus either at a time of recording or at a time of reproducing, and wherein the addresses t are set consecutively with respect to a physical arrangement of the sectors in each of the areas A2 and A3, and the area A1 has at least one inconsecutive part at which the addresses t are not consecutive with respect to the physical arrangement of the sectors.

In this configuration, because the addresses t are set consecutively with respect to the physical arrangement of the sectors for the areas A2 and A3 as in a normal manner, information can be reproduced even from the optical information recording medium produced for recording at a high speed through a conventional recording apparatus produced for recording at a low speed or by a reproducing apparatus. On the other hand, because the area A1 has at least one inconsecutive part at which the addresses t are not consecutive with respect to the physical arrangement of the sectors, an error occurs when the area A1 is accessed at the time of recording operation. Accordingly, it is possible to provide the optical information recording medium produced for recording at a high speed to which recording cannot be performed through a recording apparatus produced for recording at a low speed.

The inconsecutive part may have no sector range between an address t1' and an address t2' which are not consecutive, where t1<t1', t2'<t2, and the starting address t1 of the area A1 may be set precedingly by the amount of (t2'−t1').

Accordingly, although the inconsecutive part is provided, no range in which the addresses are not understandable/recognizable exists, and also, it is possible to secure the area A1 equivalent to that in the case where this inconsecutive part is not provided.

The inconsecutive part may have a range of A1' in the direction of the physical arrangement of the sectors between addresses t1' and t2', the addresses from the address t1' to the address t2' are not consecutive, where t1<t1', and t2'<t2, and arbitrary addresses tx may be set in the range A1'.

Thereby, although the inconsecutive part is provided, it is possible to set arbitrary addresses tx in the range of the inconsecutive part. Accordingly, it is possible to utilize the inconsecutive part by setting additional information therein.

The inconsecutive part may have a range of A1' in the direction of the physical arrangement of the sectors between addresses t1' and t2', the addresses from the address t1' to the address t2' are not consecutive, where t1<t1', and t2'<t2, and there may be no addresses set in the range A1'.

Thereby, because no addresses exist in the inconsecutive part, it is possible to make an error positively occur at the inconsecutive part when an attempt is made to record information to the recording medium through a conventional recording apparatus produced for recording at a low speed, and, thus, to prevent writing thereto through this recording apparatus.

The recording medium may further comprise a pre-pit in the inconsecutive part.

Thereby, because the pre-pit is provided in the inconsecutive part, it is possible to add information in the inconsecutive part.

The addresses may be recorded in wobbles of a guide groove.

Because the addresses are thus recorded in a form of wobbles of the guide grove of the recording medium, and a track signal is used, it is possible to specify the addresses separately from a recording signal.

The recording medium may be configured to have a characteristic such that, a degree of modulation is equal to or lower than 0.5 obtained when recording is made through the recording apparatus employing either an optical pickup for CD having a wavelength $\lambda=789$ nm, and a numerical aperture of an objective lens NA=0.50 or an optical pickup for DVD having a wavelength $\lambda=650$ nm, and a numerical aperture of an objective lens NA=0.60, at a relative speed V such that V=0.5 Vmin where Vmin represents the lowest recordable relative speed between the optical pickup and the recording medium, with a recording signal of the largest mark length using a light-emitting waveform comprising a multi-pulse sequence.

Accordingly, whether it is for CD or for DVD, the characteristic such that the degree of modulation is equal to or smaller than 0.5 is obtained when recording is made at the speed V=0.5Vmin which is ½ of the lowest recording speed Vmin guaranteed for the recording medium. Therefore, recording to the recording medium cannot be performed properly through a conventional recording apparatus produced for recording at a low speed, consequently, and, as a result, an error occurs such that an OPC error is forwarded in recording of trial writing or the like. On the other hand, the recording characteristic can be improved for V$\geq$Vmin for the recording medium.

A recording apparatus, according to the present invention comprises:

a detecting part which detects as to whether or not the inconsecutive part exists in the area A1 of the above-mentioned recording medium according to the present invention; and a correcting part which performs correlation for the inconsecutive addresses thereof when the inconsecutive part is detected by the detecting part.

In this configuration, when recording to the optical information recording medium having the inconsecutive part in the area A1 produced for recording at a high speed is performed, the detecting part detects the inconsecutive part, and the correcting part performs address correction for the inconsecutivity of the addressees thereof. Thereby, it is possible for the recording apparatus to access the area A1 without generating any problem, and to perform normal recording processing.

Other objects and further features of the present invention will become more apparent from the following detailed description when read in conjunction with the accompanying drawings.

DETAILED DESCRIPTION OF THE PREFERRED EMBODIMENTS

One embodiment of the present invention will now be described based on FIGS. 1 through 5. First, a sector and address structure of an optical information recording medium 1 in the embodiment of the present invention to which data recording at a high speed can be performed will now be described with reference to FIGS. 1 and 2.

Sectors are previously formed in a recording area of the optical information recording medium 1 in the embodiment of the present invention at least before information is recorded thereto, and an address is assigned to each sector. The addresses are ones which can specify the corresponding sectors, respectively. Information concerning these addresses are preferably recorded in a manner in which the information is modulated into wobbles of a guide groove of the optical information recording medium 1. For example, ATIP (Absolute Time In Pregroove) in CD-R disks or CD-RW disks, and ADIP (Address In Pregroove) in rewriteable DVD+RW disks are examples therefor.

Figure 1:
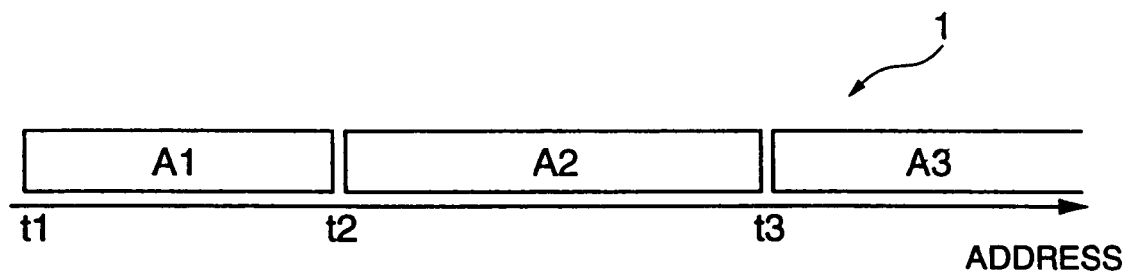
FIG. 1 typically illustrates a sector and address structure of an optical information recording medium in an embodiment of the present invention.

The optical information recording medium 1 has at least three recordable areas A1, A2 and A3 as shown in FIG. 1. The area A1 is an area to which a recording apparatus accesses only at a time of recording operation (at a time of processing operation in prior to actual recording). An information management area for a recording apparatus or the like is one example thereof. As an actual example, an area for trial writing before recording for setting a recording power for a laser light of an optical pickup for recording (PCA (Power Calibration Area) in a CD-R disk, CD-RW disk, DVD+RW disk, or the like) corresponds to the area A1. This area A1 extends from a starting address t1 to an end address t2.

The subsequent area A2 is an area to which a recording apparatus accesses at a time of recording operation and also accesses at a time of reproducing operation (at a time of processing operation in prior to actual reproducing). For example, this area is used as an area for managing recorded information in many cases. As an actual example, a PMA (Program Memory Area) in a CD-R disk and a CD-RW disk corresponds to this area A2. This area A2 extends from a starting address t2 to an end address t3.

The subsequent area A3 is an area to which a recording apparatus accesses at a time of recording (at a time of execution of actual recording processing) and at a time of reproducing (at a time of execution of actual reproducing processing), and an apparatus (only) for reproducing accesses at a time of reproducing. To this area, information (data) is actually recorded. A program area in a CD-R disk and a CD-RW disk corresponds to this area A3. This area A3 starts from a starting address t3.

Figure 6:
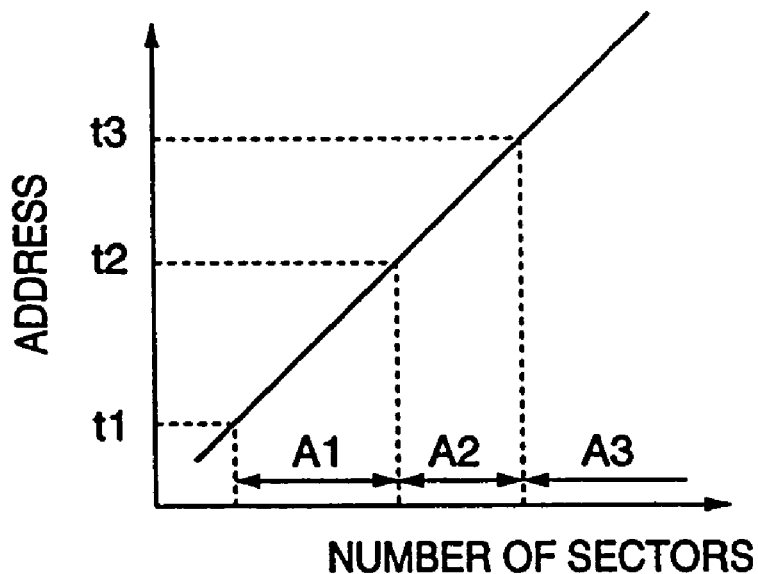
FIG. 6 shows an example of relationship between the number of sectors and address in an optical information recording medium in the related general art.

For a conventional optical information recording medium produced for recording at a low speed, as shown in FIG. 6, addresses t are consecutively assigned and set according to a predetermined rule, according to a physical arrangement of sectors on the optical information recording medium. That is, a relationship between the physical arrangement of the sectors and addresses is, as shown in FIG. 6, such that, as the number of sectors increases (or decreases), the address increases, and, according to a rule particular to the recording medium, the address always changes consecutively. A recording apparatus detects an absolute position on the optical information recording medium from the address, and performs recording thereto. However, for an optical information recording medium produced for recording at a high speed, if the sector and address structure shown in FIG. 6 is applied thereto, there is a possibility that even an apparatus produced only for recording at low speed can also perform recording thereto forcibly.

In this point, the optical information recording medium 1 in the embodiment of the present invention has the area A1 which is accessed only at a time of recording operation and is previously formatted so that at least one inconsecutive part at which the addresses t are not consecutive with respect to the physical arrangement of sectors is provided. This inconsecutive part is set between an address t1' through an address t2'. These addresses t1' and t2' are those such that t1<t1'<t2'<t2 in the area A1.

The assesses t1' and t2' of the inconsecutive part are determined based on a point at which a recording apparatus produced for recording at a low speed, for which recording thereto is to be prevented, accesses in the area A1. For example, when the recording apparatus produced for recording at a low speed accesses an address t0 in the area A1 at a time of recording operation, the addresses t1' and t2' are set so that the above-mentioned address t0 is in the inconsecutive part, that is, this address t0 is included between the address t1' through t2'.

Figure 2A:
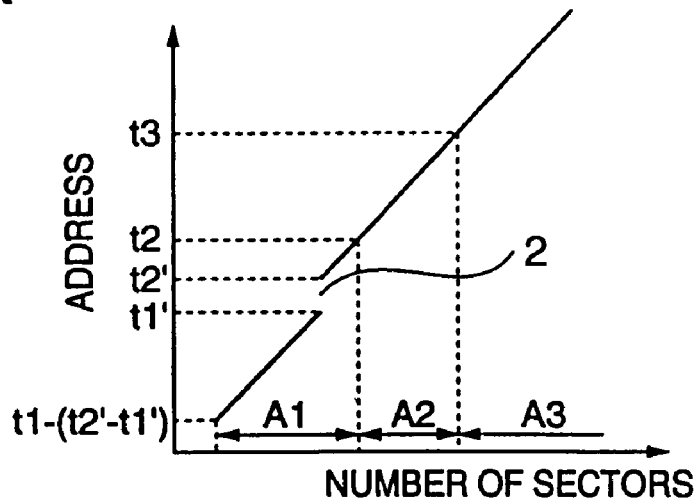
FIGS. 2A, 2B and 2C illustrate three examples of relationship between the number of sectors and address in the optical information recording medium in the embodiment of the present invention.
Figure 2B:
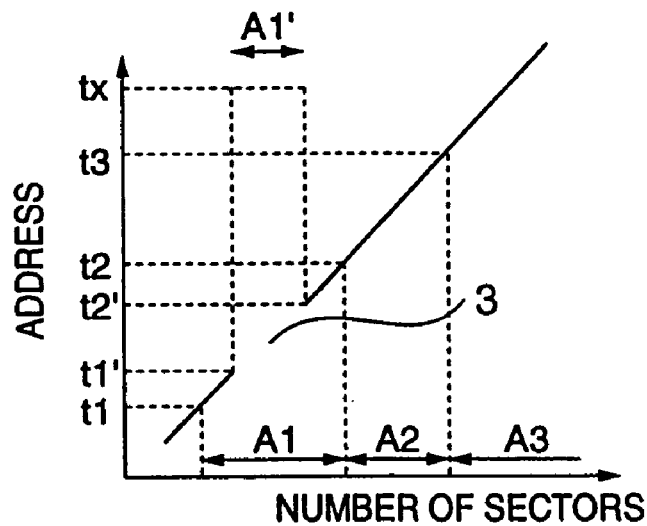
Figure 2C:
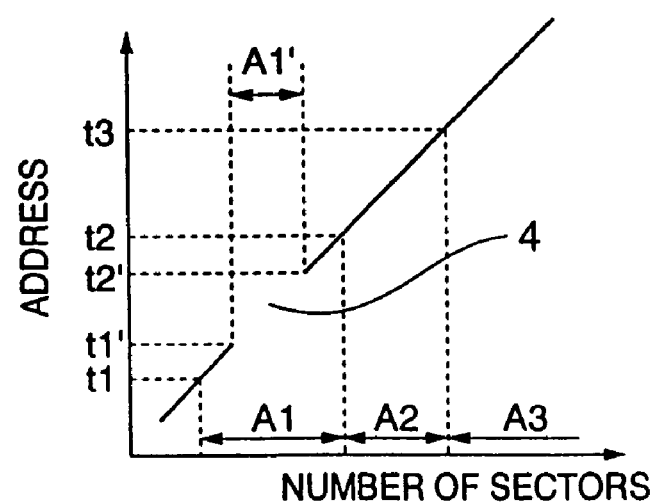

A form of this address-t inconsecutive part may be set arbitrarily. FIGS. 2A, 2B and 2C show three typical examples in pattern of the form of the address-t inconsecutive part. FIG. 2A shows a pattern in which the inconsecutive part 2 has no sector range. In this example, no sectors exist between the addresses t1' and t2', as shown in FIG. 2A, and thereby the addresses are not consecutive at this inconsecutive part 2. In this case, in comparison to the address setting in the general related art shown in FIG. 6, the number of sectors included in the area A1 is smaller by the number corresponding to the addresses t1' through t2' of the inconsecutive part 2. Therefore, the starting address t1 of the area A1 is set precedingly for this difference (reduction). Specifically, t1−(t2'−t1') is set as the starting address of the area A1 in this case. According to this arrangement, it is possible to form the inconsecutive part 2 at which the addresses t are not consecutive without decreasing the number of useable sectors included in the area A1, and, also without providing any area in which the address t are not understandable/recognizable.

FIG. 2B shows an example in which the inconsecutive part 3 at which the addresses t are not consecutive is formed having a range A1' in the direction of the physical arrangement of sectors. In this case, arbitrary addresses tx can be freely set in the range A1' of the inconsecutive part 3. Accordingly, by setting arbitrary addresses tx in the inconsecutive part 3, it is possible to cause the range A1' to have additional information using the addresses tx such as description of the type of recording medium, or the like in the inconsecutive part 3 at which the addresses t are not consecutive.

FIG. 2C shows an example in which the inconsecutive part 4 is formed similar to the above-mentioned inconsecutive part 3 shown in FIG. 2B. However, the range A1' of the inconsecutive part 4 has no addresses t. For example, in order to cause the inconsecutive part 4 to have no addresses, in a case where the addresses are recorded through wobble modulation of a pregroove (guide groove), wobble modulation is not made, the wobbles themselves are not provided, or the pregroove itself is not provided therein. When the pregroove itself is not provided therein, a pre-pit may be set in the area A1 so as to prevent track removal when the range A1' of the inconsecutive part 4 is long. In this case, it is possible to arbitrarily set information to be recorded in the pre-pit. By providing the inconsecutive part 4 having no addresses, it is possible that an error is positively caused to occur when an attempt of recording to the optical information recording medium 1 is made through a recording apparatus produced for recording at a low speed, as described later.

Figure 3:
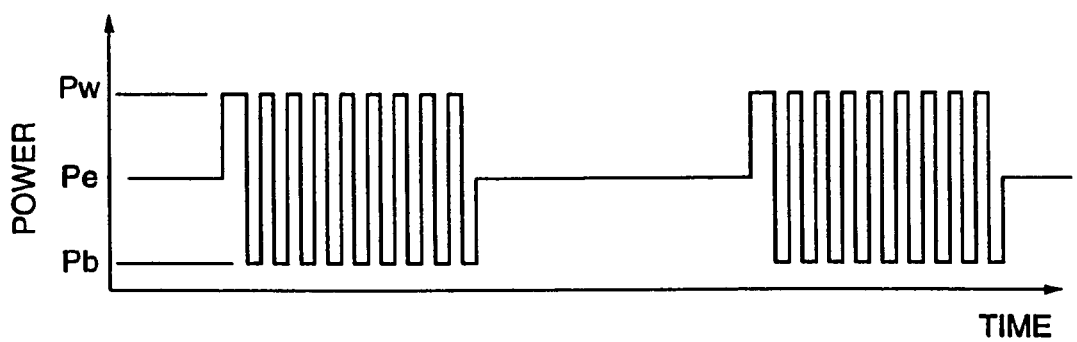
FIG. 3 illustrates a waveform of a recording signal used in experiments performed for the optical information recording medium in the embodiment of the present invention.

A medium property of the optical information recording medium 1 in the embodiment of the present invention is improved so that recording thereto at a high speed can be rendered. However, it is preferable that the following setting is made such that recording through a recording apparatus produced for recording at a low speed can be positively prevented. That is, when an optical pickup for CD of wavelength λ=789 nm and numerical aperture of objective lens NA=0.50 or an optical pickup for DVD of wavelength λ=650 nm and numerical aperture of objective lens NA=0.60 is used, it is preferable that characteristics obtained when recording is performed at a relative speed which is ½ of the lowest speed Vmin guaranteed for the recording medium (lowest recordable relative speed) between the pickup and recording medium, that is, V=0.5Vmin, are as follows. In this case, as a recording signal, as shown in FIG. 3, a multi-pulse sequence including repetitions of heating pulses and cooling pulses, and, having the maximum mark length of 11T. The recording power Pw is set arbitrarily, and, the erasing power Pe is set as 0.5Pw. In this condition, the degree of modulation $m_{11}$ (=$I_{11}$/Rtop, where Rtop represents the maximum reflectance for a portion at which information is not written, and $I_{11}$ represents the reflectance for a portion at which the maximum mark length 11T is recorded) is measured when the signal recorded to the optical information recording medium 1 is reproduced by using the optical pickup used in the recording, and the degree of modulation $m_{11}$ is such that $m_{11} \leq 0.5$. In the optical information recording medium 1 having the above-mentioned characteristics, it is possible to increase the degree of modulation at the maximum recording speed Vmax guaranteed for the recording medium, and to obtain stable characteristics of recorded signal when recording is performed at a high speed.

Figure 4:
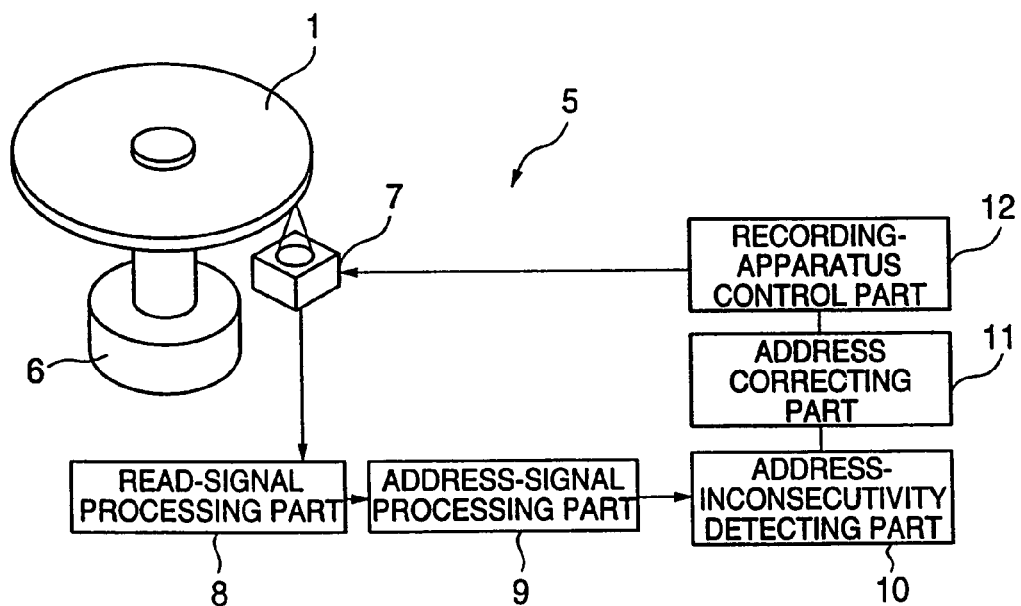
FIG. 4 is a block diagram showing a general configuration of a recording apparatus in one embodiment of the present invention.

A recording apparatus 5 in an embodiment of the present invention which can perform recording information to the optical information recording medium 1 to which recording can be performed at a high speed will now be described with reference to FIG. 4. Basically, a configuration for preventing the above-mentioned inconsecutive part 2, 3 or 4 from having any influence at a time of recording operation is provided. In this recording apparatus 5, although details are omitted, an optical pickup 7 including a laser light source, an objective lens, a photodetector and so forth for applying a light beam for recording or reproducing to the optical information recording medium 1 which is driven and rotated by a spindle motor 6, a read-signal processing part 8 which performs extraction of an address signal from a read signal detected by the photodetector of the optical pickup 7, an address-signal processing part 9 which performs demodulation processing on the address signal obtained from the read-signal processing part 8, an address-inconsecutivity detecting part 10 which detects whether or not address inconsecutivity exists, based on the output of the address-signal processing part 9, an address correcting part 11 which performs predetermined address correction when address inconsecutivity is detected by the address-inconsecutivity detecting part 10, and a recording-apparatus control part 12 provided for controlling the laser light source in the optical pickup 7.

In the above-mentioned configuration of the recording apparatus 5, the light beam is condensed and applied to the optical information recording medium 1 which is driven and rotated by the optical pickup 7, the reflected light from the optical information recording medium 1 is received by the photodetector, and, thereby, a signal is read out from the optical information recording medium 1. Only an address signal is extracted from the thus-read signal by the read-signal processing part 8. The thus-extracted address signal is demodulated by the address-signal processing part 9, and, thereby, a point at which the light beam is currently applied to the optical information recording medium 1 is specified. At this time, in a recording apparatus produced for recording at a low speed in the general related art which does not have the address-inconsecutivity detecting part 10, when address inconsecutivity occurs as a result of the inconsecutive part 2, 3, or 4 being accessed, it is determined that tracking failure has occurred, and an error signal is forwarded to the recording-apparatus control part 12. Accordingly, it is not possible that subsequent processing, that is, trial writing and recording processing which is to be performed in a normal state, cannot be performed. Thereby, writing of information to the optical information recording medium 1 is prevented from being performed by the recording apparatus produced for recording at a low speed.

In contrast to this, in the recording apparatus 5 in the embodiment of the present invention described with reference FIG. 4, the address-inconsecutivity detecting part 10 and address correcting part 11 are provided, and address information concerning the inconsecutive part 2, 3 or 4 in the area A1 of the optical information recording medium 1 is previously recognized. Accordingly, when address inconsecutivity occurs at an access to the area A1, the address-inconsecutivity detecting part 10 recognizes that the address inconsecutivity has occurred due to the inconsecutive part 2, 3 or 4, and outputs this matter to the address correcting part 11. As a result, the address correcting part 11 performs address correction such that the addresses at the inconsecutive part 2, 3 or 4 are skipped, and then, outputs address information to the recording-apparatus control part 12. Thus, without being affected by the address inconsecutivity due to the inconsecutive part 2, 3 or 4, and, through predetermined control by the recording-apparatus control part 12 or the like, trial-writing processing by accessing the area A1 (setting of the recording power Pw) and so forth is performed. Thereby, it is possible to perform recording processing to the area A3 or the like, which is to be performed in the normal state.

With regard to reproducing processing performed through a recording or reproducing apparatus, whether it is produced for recording at a low speed or a high speed, no access to the area A1 is performed, and, access to the areas A2 and A3 in which the addresses t are set consecutively according to the physical arrangement of sectors is performed. Therefore, reproducing processing can be rendered without occurrence of any problems.

At least the above-described processing performed by the address-inconsecutivity detecting part 10 and address correcting part 11 may be performed by a general-purpose computer as a result of instructions written in a software program including program code means for performing the processing to be executed thereby. The software program may be recorded in a carriable recording medium such as a CD-ROM, which is read therefrom through a CD-ROM drive, and is provided to the CPU of the computer. Then, the CPU performs the processing according to the program.

Actual examples of the above-described of the optical information recording medium 1 in the embodiment of the present invention described above will now be described.

FIRST EXAMPLE

A substrate for a CD-RW was prepared in which, on a transparent substrate made of polycarbonate, a continuous guide groove was formed spirally. For address information (ATIP) to be recorded in the guide groove, the inconsecutive part 2 of ATIP inconsecutivity in a form as shown in FIG. 2A was formed at the address t1' and t2' in the following manner:

t1=96:25:10 t1'=96:41:49 t2'=97:11:50 t2=97:23:50 t3=97:27:00

An area in which the above-mentioned inconsecutive part 2 was formed is a PCA, which is an area to which trial writing is performed with the power being changed, in order to determine the recording power Pw, at a time of recording operation, by a recording apparatus. The addresses t1' and t2' were determined in consideration of a position at which the recording apparatus accesses at a time of the recording operation.

Further, for the area other than the inconsecutive part 2, ATIP information which can be used for 1 through 4 times (1× through 4×) of a normal reproduction speed of a compact disk which is produced in accordance with the Orange Book, Part III, ver. 2.0, which is the specification of standards for CD-RW was recorded thereto.

Figure 5:
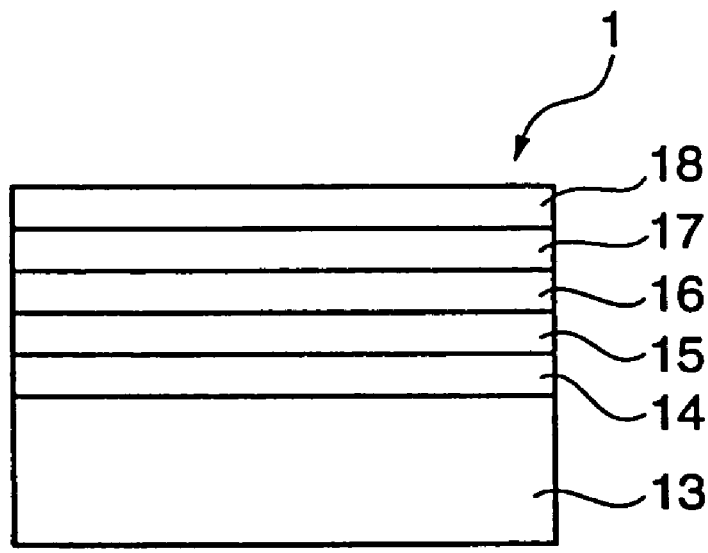
FIG. 5 shows a side elevational sectional view of an example of the optical information recording medium in the embodiment of the present invention.

Then, as shown in FIG. 5, onto the thus-obtained transparent substrate 13, a lower dielectric layer 14, a recording layer 15, an upper dielectric layer 16, a metal reflection layer 17 and a protection layer 18 were formed. Thus, the optical information recording medium 1 was obtained. Each of the lower and upper dielectric layers 14 and 16 were made of a mixture mainly containing ZnS and $SiO_2$, the recording layer 15 was made of a phase-change material mainly containing AgInTeSb, and the metal reflection layer 17 was made of a material mainly containing A1. Further, the lower and upper dielectric layers 14 and 16 were formed by RF spattering, and the recording layer 15 and metal reflection layer 17 were formed by DC spattering. The protection layer 18 was formed as a result of a film of a UV curing resin being deposited by spin coating, and then, UV light being applied thereto so as to cure it.

By initializing the thus-obtained optical information recording medium 1 through a CD-RW initializing apparatus, it was possible to obtain a not-yet-recorded CD-RW recording medium. Thus-obtained recording medium has the above-mentioned inconsecutive part 2 at which addresses are not consecutive formed in the PCA area.

An experiment was performed so as to determine whether or not recording can be made to this CD-RW recording medium having the inconsecutive part 2 at which addresses are not consecutive in the PCA area as mentioned above, through a recording apparatus (produced for recording at a low speed) available at stores. The recording apparatus used is a CD-R/RW drive MP-7060A made by Ricoh Company Ltd. When an attempt was made to record information to the CD-RW recording medium through this recording apparatus, an error occurred at an initial stage of recording operation, and the recording medium was ejected by the apparatus.

On the other hand, the above-mentioned recording apparatus was modified so as to additionally include the above-mentioned address-inconsecutivity detecting part 10 and address correcting part 11, and, then, the attempt was made to record information to the CD-RW recording medium (optical information recording medium 1) through this modified recording apparatus. As a result, although inconsecutivity of ATIP exists in the PCA area due to the inconsecutive part 2, the address correcting part 11 performed correction for the addresses for 00:30:00 in the inconsecutive part 2 which are not consecutive. Thereby, recording operation such as trial writing and so forth was performed without occurring any problem, and, then, actual recording was started by the recording apparatus. Thus, it was confirmed that, while recording can be performed to the optical information recording medium 1 in the embodiment of the present invention through the recording apparatus 5 in the embodiment of the present invention, recording cannot be performed to the same optical information recording medium 1 through the original (not modified) recording apparatus produced for recording at a low speed.

SECOND EXAMPLE

A CD-RW recording medium was produced in a manner similar to that in the case of the above-described first example. However, the composition ratio of the material of the recording layer thereof was changed so that recording at a high speed such as 4× through 8× can be performed thereon. Then, a CD-RW disk evaluating apparatus DDU1000 ($\lambda$=789 nm, NA=0.50) was used, and recording was performed on the thus-produced CD-RW recording medium at speeds of 8× (V=9.6 m/s), 4× (V=4.8 m/s) and 2× (V=2.4 m/s) with the recording signal of multi-pulse waveform shown in FIG. 3. The recording power Pw was determined by an OPC method which is in accordance with the Orange Book, Part III, ver. 2.0, which is the specification of standards for CD-RW.

The thus-recorded signals were read at a reproduction speed of 1×, and the above-mentioned degree of modulation $m_{11}$ for each recording speed was measured. As a result, the following results were obtained:

8×: $I_{11}/R\text{top}$=0.65

4×: $I_{11}/R\text{top}$=0.56

2×: $I_{11}/R\text{top}$=0.45

Thus, the sufficient degrees of modulation were obtained for the recording signals for the recording speeds of 8× and 4×. However, the degree of modulation was low for a low speed such as 2× in a conventional manner, and is lower than 0.55 which is the lowest standard value for CD-RW. Accordingly, the optical information recording medium 1 in the embodiment of the present invention is a recording medium to which recording cannot be performed properly at a low speed such as 2×.

Then, when an attempt was made to write information to the above-mentioned CD-RW recording medium through the above-mentioned conventional recording apparatus which was not modified and thus does not have the address-inconsecutivity detecting part 10 and so forth and was used for the above-mentioned first example, the CD-RW recording medium was ejected by the recording apparatus before recording is made, similarly.

The present invention is not limited to the above-described embodiments, and variations and modifications may be made without departing from the scope of the present invention.

The present application is based on Japanese priority application No. 2000-058081, filed on Mar. 3, 2000, the entire contents of which are hereby incorporated by reference.

What is claimed is:

1. A phase change optical information recording medium on which information is recorded through application of light with a wavelength $\lambda$=650 nm thereto, comprising: a characteristic such that a degree of modulation which is a value that a reflectance for a portion, at which a longest mark having a maximum mark length is recorded, is divided by a maximum reflectance for a portion at which information is not written when reproducing information by using an optical pickup of a recording apparatus is obtained, said recording of the longest mark being performed by a recording signal which is a multi-pulse sequence including repetitions of heating and cooling pulses and having the maximum mark length, wherein the degree of modulation is lower than a lowest standard value defined by a specification of standards of the optical information recording medium when recording of the longest record mark by the light emitted from an optical pickup is made at a recording speed of V=0.5Vmin, wherein Vmin is a minimum recording speed corresponding to a lowest recordable relative speed between the pickup and the recording medium, wherein the minimum recording speed Vmin is a lowest recording speed guaranteed to prevent from occurring nonsense writing for the optical information recording medium by the specification of standards.

2. The optical information recording medium as claimed in claim 1, having a configuration in which, on a transparent substrate, a lower dielectric layer, a recording layer, an upper dielectric layer, a metal reflection layer and a protection layer are formed.

3. The optical information recording medium as claimed in claim 2, wherein:

said recording layer mainly comprises AgInTeSb.

4. The optical information recording medium as claimed in claim 2 or 3, wherein:

said lower dielectric layer and upper dielectric layer mainly comprise ZnS and $SiO_2$.

5. The optical information recording medium as claimed in claim 2 or 3 wherein: said metal reflection layer mainly comprises A1.

* * * * *